UNITED STATES PATENT OFFICE.

THOMAS J. LUMMUS, OF LYNN, MASSACHUSETTS.

IMPROVED RED INK.

Specification forming part of Letters Patent No. 46,684, dated March 7, 1865.

*To all whom it may concern:*

Be it known that I, THOMAS JEFFERSON LUMMUS, of the city of Lynn, in the county of Essex and State of Massachusetts, have invented a new Sort or Kind of Red Ink; and I do hereby declare that the following is a full and exact description thereof.

A solution of one of the salts of aniline known as "rosine" is made in alcohol and proper proportions of the gums of acacia and myrrh added in order to give the required consistence to the fluid, and the whole is diluted with distilled water until it becomes of proper density for writing-ink. The proportions of ingredients I commonly use are as follows: rosine, one ounce; alcohol, two pints; distilled water, two gallons; gum-acacia, two ounces; gum-myrrh, two ounces. Mix the rosine and alcohol in a porcelain mortar. Then filter and add the distilled water and gums, allowing the fluid to take up such quantities of gums as can be retained in solution. The gum-myrrh is used to assist as an antiseptic.

I do not confine myself to fixed quantities of the ingredients, as the proof of spirit, the temperature, and the specific gravity of the water are to be considered in the preparation, and materially affect the quantities. The color is also to be varied by change of quantities.

The advantages of this ink are as follows: This ink is more permanent and durable than any red inks in common use, or than any that may be made for a much greater cost. It is known to be fully equal, if not superior, to pure carmine in this quality. Its color is brighter and more intense than that of common red inks. It does not corode upon steel pens so rapidly as carmine or other red inks in common use, the quantity of acid contained being slight, and therefore does not change color upon the steel pen while writing. The alcohol contained renders it less likely to become frozen if exposed to cold. It never turns thick in the inkstand or precipitates sediment, except perhaps a slight excess of gum may be settled, but never enough to become troublesome, as is frequently the case in other inks. Usually there is no sediment whatever.

I do not claim to be the inventor of an alcoholic solution of the aforesaid ingredients, knowing that the principal coloring material is well known to dyers and others.

What I claim as new, and desire to secure by Letters Patent, is—

The use of a solution of the above-named salt in alcohol or other equivalent neutral spirit, as in red writing ink or fluid, substantially as described.

THOMAS J. LUMMUS.

Witnesses:
WM. H. HARNEY,
CHAS. M. MAUDANT.